United States Patent
McGuire et al.

(10) Patent No.: US 6,598,186 B1
(45) Date of Patent: Jul. 22, 2003

(54) SYSTEM AND METHOD FOR COMPILE-TIME CHECKING OF UNITS

(75) Inventors: Morgan S. McGuire, Tarrytown, NY (US); Mathew J. Hostetter, Cambridge, MA (US)

(73) Assignee: Curl Corporation, Cambridge, MA (US)

( * ) Notice: Subject to any disclaimer, the term of this patent is extended or adjusted under 35 U.S.C. 154(b) by 0 days.

(21) Appl. No.: 09/540,053

(22) Filed: Mar. 31, 2000

Related U.S. Application Data (63) Continuation-in-part of application No. 09/410,264, filed on Sep. 30, 1999.

(51) Int. Cl.[7] .............................................. G06F 11/00
(52) U.S. Cl. ........................................ 714/48; 708/206
(58) Field of Search ........................... 714/49, 38, 722; 708/490, 235, 205, 131, 130, 206

(56) References Cited

U.S. PATENT DOCUMENTS

| | | | | |
|---|---|---|---|---|
| 4,319,130 A | * | 3/1982 | Spitzner | 341/75 |
| 4,686,643 A | * | 8/1987 | Ishiwata | 708/206 |
| 4,881,189 A | | 11/1989 | Proctor | 364/715.05 |
| 5,216,627 A | | 6/1993 | McClellan et al. | 364/700 |
| 5,371,694 A | | 12/1994 | Kawawaki et al. | 364/709.16 |
| 5,379,239 A | | 1/1995 | Nakatani | 364/715.05 |

OTHER PUBLICATIONS

"Wolfram Research"; Miscellaneous Units, http://documents.wolfram.com/v4/AddOns/Units/None.html, 1988, 1999 prntd. Sep. 21, 1999.

"Mathcad 8 Stanadrd Full Feature Listing", http://www.mathsoft.com/mathcad/80dir/standard/80feat.html, downloaded Dec. 21, 1999.

"Manipulation of physical quantities using Java," http://infoweb.magi.com/~wb/quantity, html, downloaded May 29, 2002 (6 pp.).

(List continued on next page.)

Primary Examiner—Robert Beausoliel
Assistant Examiner—Christopher McCarthy
(74) Attorney, Agent, or Firm—Hamilton, Brook, Smith & Reynolds, P.C.

(57) ABSTRACT

A system and method create and manipulate variables having both a numeric value and a units designation. The units designation is a vector of unit exponents which are operated upon consistent with operations on values. Exactly defined and underdefined quantities are stored in data structures of values and unit designations. Operations on underdefined quantities may result in expression data structures of operand quantities, operators and unit designations. The system allows the creation of variables having a unit specification and the transparent manipulation of such a variable during conventional numerical and logical operations. The system automatically signals an error condition when an operation is attempted on a set of variables having incompatible units designations. Error conditions can be detected at both compile-time and run-time. The system also includes both a predetermined dictionary of units and a customizable dictionary of units. In addition, conversion factors can be specified allowing the automatic conversion between variable of the same kind (i.e. distance) but different underlying units (i.e. yards and meters.) The invention is implemented on a computer and can be an extension to a programming language resulting in such variables being considered first class data types.

30 Claims, 5 Drawing Sheets

OTHER PUBLICATIONS

Schneider, H.J., "Physikalische Masseinheiten und das Typkonzept moderner Programmiersprachen," *Informatik Spektrum*, 11:5(256–263), Oct. 1988.

Ono, N., "Dealing with physical quantities in object–oriented database," *Artificial Intelligence in Engineering*: 9(3), 1995, pp. 191–201.

Novak, Jr., G.S., "Conversion of Units of Measurement," *IEEE Transcations on Software Engineering*: 21(8), Aug. 1, 1995, pp. 651–661.

Cmelik, R.F. and N.H. Gehani, "Dimensional Analysis with C++, " *IEEE Software*: 5(3), 5/88, pp. 21–27.

Gehani, N. "Units of Measure as a Data Attribute," *Computer Languages* 2 (3), 1977, pp. 93–111.

Cunis, R., "A Package for Handling Units of Measure in Lisp," *ACM Lisp Pointers:* 5(2), 1992 (downloaded Dec. 20, 2000: http://www.isi.edu,isd.LOOM/documentation measures–implementation.text) 2 pp.

Schneider, H.J., "Physical units and the type concept of modern programming languages," *Informatik Spektrum:* 11(5), pp. 256–263, Oct. 1998.

Baldwin, G., "Implementation of physical units (Pascal), " *SIGPLAN Notices*: 22 (8), pp. 45–50, Aug. 1987.

Wolfram, Stephen; "Mathematica, A System for Doing Mathematics by Computer", 2d edition, 1991, pps. 85–86.

ADC Technology Developer Documentation: Mac OS 8; "Wysiwyg://doc. 31/http://developer . . . criptLangGuide/AppleScript.39.html," 1999, updated May 21, 1999, prntd. Sep. 21, 1999.

"The Mathematica Book", Miscellaneous Packages, http://documents.wolfram.com/v4/frames/AddOns/IntroTour/Tour/S5.0.7.html, 1988, 1989 prtnd. Sep. 21, 1999.

\* cited by examiner

SYSTEM AND METHOD FOR COMPILE-TIME CHECKING OF UNITS

RELATED APPLICATION

This application is a Continuation-in-Part of Ser. No. 09/410,264 filed Sep. 30, 1999, which is related to an application having Ser. No. 09/409,290 filed by Morgan McGuire, entitled "Units System and Method With Underdefined Quantities," on Sep. 30, 1999, the entire teachings of which are incorporated herein by reference.

BACKGROUND OF THE INVENTION

Computer languages utilize variables to manipulate, reference and represent data. For instance, in a conventional programming language a variable Temperature can be created, referencing a value stored in memory that represents the temperature of an underlying process being modeled the program. The computer can perform operations on the variable, changing the value referenced by Temperature. But the variable Temperature does not have an inherent understanding of the units for the data referenced therein.

In one example, the computer program simulates a process where the variable Temperature changes. The variable Temperature can be modified by the operation of the program. Temperature can be increased by addition of another value represented by the variable Increase. Temperature may represent a value stored in the Celsius scale, and Increase may represent a value stored in the Fahrenheit scale. If the computer program is not adapted correctly by the programmer to carefully monitor the units for each variable, the results from the operation of the program can be in error. In this example, if Increase is 5° C. and Temperature is 0° F., and the values are simply added, the result is 5 which, in either the Celsius or Fahrenheit scale, is incorrect. Without an understanding of the units represented by each variable, the program will operate incorrectly.

As another example, take a program calculating a force on an object. The variable Object-Mass can be assigned the mass of the object. Given that F=MA, an acceleration, here Acceleration, can be applied to the object, creating a force equal to Object-Mass*Acceleration. If this were assigned to a variable Force, again the programmer would be required to know the units in which Object-Mass and Acceleration were denominated so as to create the correct force unit.

SUMMARY OF THE INVENTION

In accordance with one aspect of the invention, an operation is performed on quantities in a data processing system. The quantities are stored in data structures, each data structure comprising a value and a unit designation representing a unit corresponding to the value. The operation is performed on the values from respective quantity data structures, and a corresponding operation is performed on the respective unit designations.

Operations on the unit designations can lead to errors, these errors can be detected at both compile-time and run-time. Operations, such as expression evaluation and assignment, may attempt to create units that are incompatible or overflowed. In one preferred embodiment, a method is performed at compile-time to check for an error condition in an operation on an operand quantity having unit designation. The method comprises: defining an operation on at least one operand, the one operand having a unit designation, the operation having a defined result having a unit designation, and performing, at compile-time, a unit error check on the operation.

In the preferred implementation, the unit designation represents exponents of a unit corresponding to the value. The unit designation may be a vector of exponents corresponding to physical units, preferably standard units of a measurement standard such as the SI standard. The unit designations may be checked for compatibility before an operation is performed. When the operation is multiplication, the exponents of respective unit designations are added. Where the operation is division, exponents of the respective units designations are subtracted. Where the operation is addition the resultant exponent is the same as the exponent of each of the unit designations. Where the operation is exponentiation, the exponents of the respective unit designations are multiplied.

The quantity data structure may further include a tag which provides a unit designation preferred for printing or as a definable units designation.

When a variable, including a unit string, is received and to be defined as a quantity, the unit designation may be obtained from the unit string as through a table lookup. Similarly, a conversion factor, either a conversion scale factor or a conversion algorithm, can be obtained from the unit string through a table lookup.

In a preferred embodiment, a variable structure is generated to store a received variable having a value and an associated unit designation. The variable structure has at least two storage slots, a first storage slot adapted to store the value and a second storage slot adapted to store a unit designation pointer. The unit designation of the received variable is stored in a unit designation structure and an address to the unit designation structure is stored in the second slot of the variable structure.

The unit designation may comprise one or more subunits, each having an exponent value, and the exponent values of the one or more subunits are stored. The one or more subunits may represent a basic unit representing a known physical quantity, preferably of the set consisting of distance, mass, time, electrical current, temperature, intensity of light, angle, and amount of substance. The one or more subunits may represent a user definable basic unit. A standard unit may be selected from a set of SI, mks, cgs and English systems of measurement.

In accordance with another aspect of the invention, an operation is performed on two variables on a computer implemented method. A first value is received from the first storage slot of a first of two variables and a second value is received from a first storage slot of a second of the two variables. The operation is performed on the first value and the second value creating a value result. A first unit designation is retrieved from the second storage slot of a first of the two variables and from the second storage slot of a second of the two variables. A unit designation result is representative of the results of the operation on the first unit designation and the second unit designation.

In accordance with a further aspect of the invention, the variable may have a standard unit designation or a definable unit designation. The variable structure has at least three storage slots. A first storage slot stores the value, a second storage slot stores the standard unit designation and the third storage slot stores the definable units designation.

In the preferred embodiment, both exactly defined quantities and underdefined quantities are stored as quantity data structures having values and unit designations.

The invention provides a system, method and data structure for handling special variables having both a value and a unit designation. Transparent support may be provided for manipulating such variables utilizing conventional numeric operators. Application of any such operations on the variables may result in an automatic check of the unit designations with a resulting error condition for improper usage. Thus, the system can create a variable having a distance unit designation and signal an error if the system attempts to add to it a variable having a time unit designation. In addition, if the operation were division, then this example would allow creation of a variable having a unit designation of distance per time.

Preferably, the system includes the ability to provide conversion factors to apply to variables to convert between unit types of the same kind. Thus, adding yards to meters automatically results in the correct answer.

Both a predetermined dictionary of standard units and a configurable dictionary of newly created units may be provided. The newly created units can further include conversion factors. Thus, an arbitrary unit designation can be created.

A preferred display mechanism allows the specification of a preferred presentation for viewing. Thus, a distance variable can include a "yards" preferred presentation resulting in the conversion of the numeric value to the preferred units.

The invention can be implemented as a first class data type in a programming language. Variables created under the invention are thus treated equivalently as a conventional variable in the programming language.

Thus, it is an advantage of the invention to provide a system and method for manipulating units. Further advantages of the invention include the ability to provide a system and method for automatically and transparently associating a unit denomination with a variable and for coercing unit denominations during operations on variables. It is also an advantage of the invention to provide a system and method for converting unit denominations during operations on variables.

These and other additional advantages will become apparent in the detailed description of the preferred embodiments and associated drawings.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION OF THE INVENTION

Figure 1:
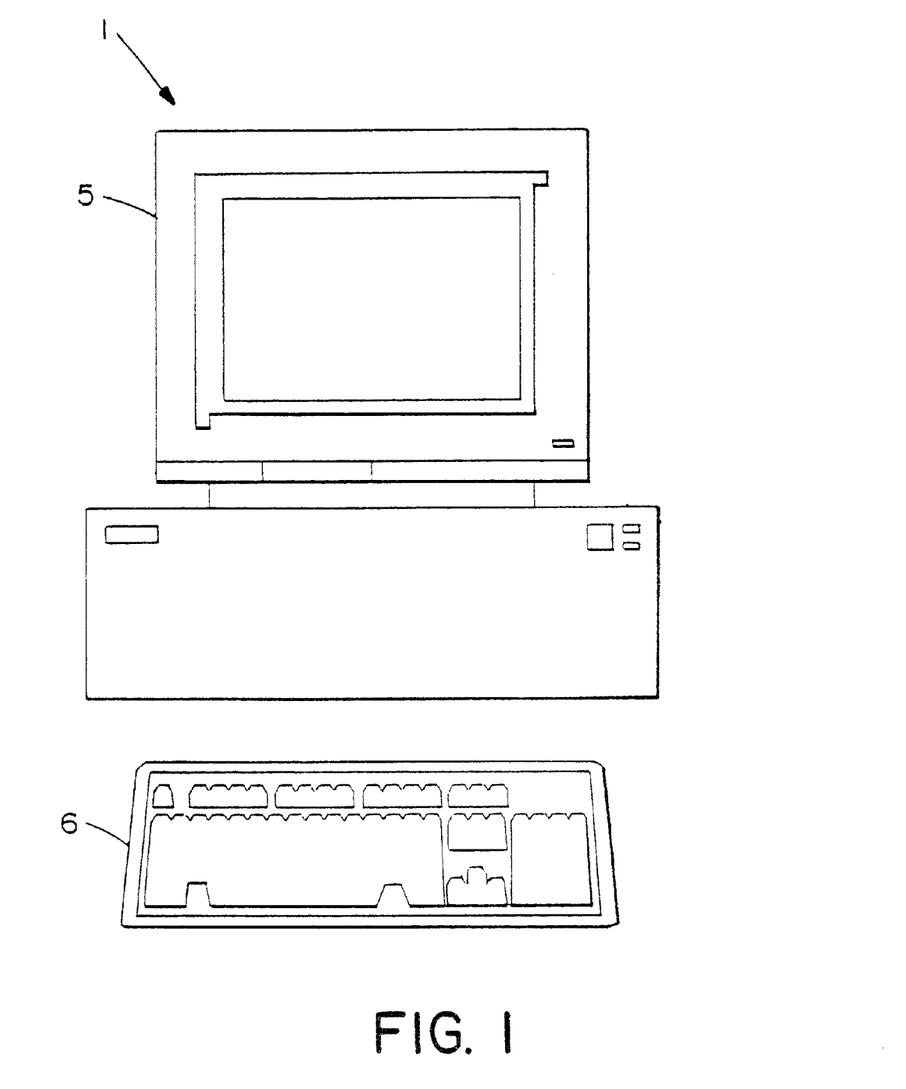
FIG. 1 illustrates a computer system on which the present invention may be implemented.

FIG. 1 shows an example of a computer system on which embodiments of the present invention may be implemented. As shown, Computer 1 includes a variety of peripherals, among them being: i) a display screen 5 for displaying images/video or other information to a user, ii) a keyboard 6 for inputting text and user commands. Computer 1 may be a personal computer (PC), workstation, imbedded system component, handheld computer, telecommunications device or any device containing a memory and processor.

Figure 2:
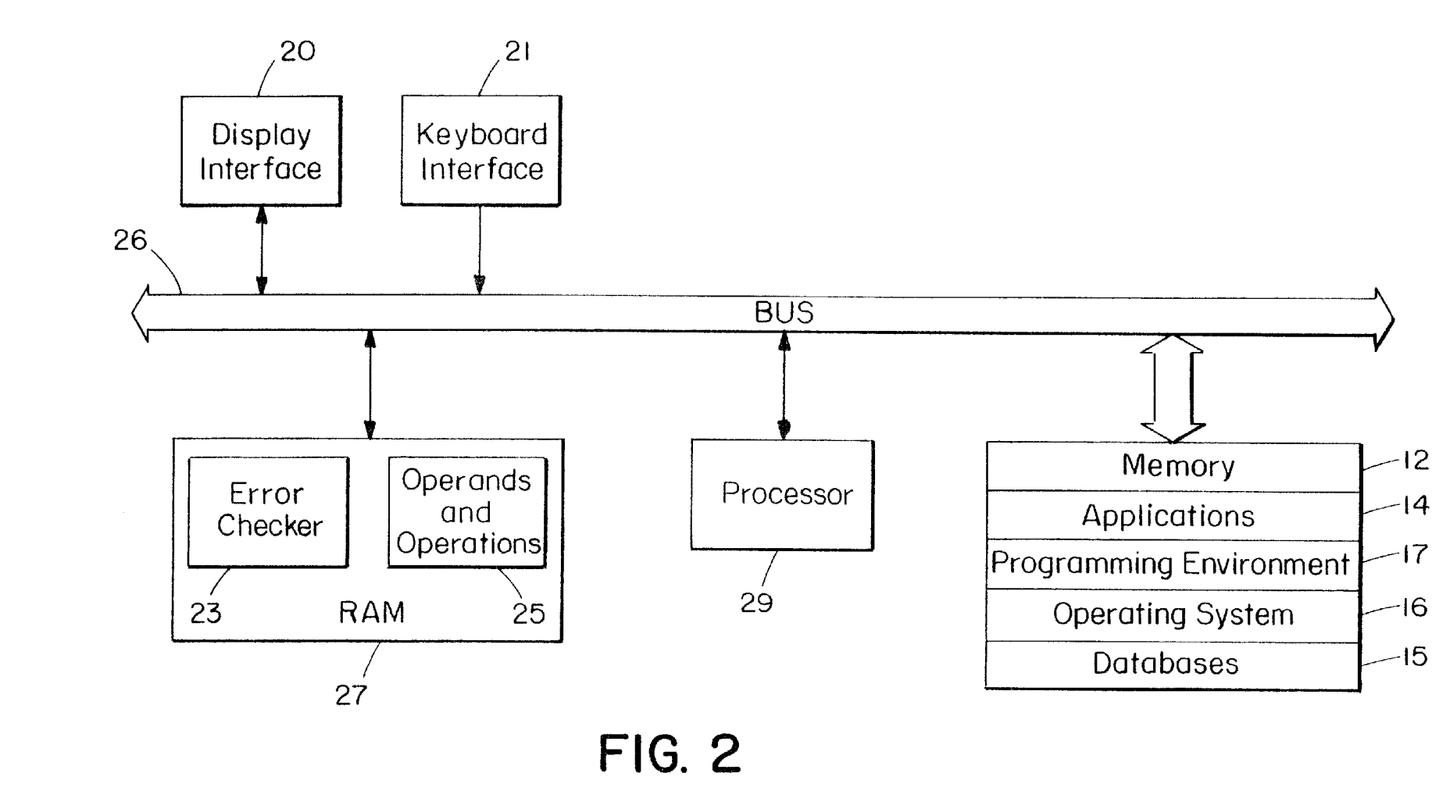
FIG. 2 shows the internal structure of the computer of FIG. 1.

FIG. 2 shows the internal structure of Computer 1. As illustrated, Computer 1 includes mass storage 12, which comprises a computer-readable medium such as a computer hard disk and/or RAID ("redundant array of inexpensive disks"). Mass storage 12 is adapted to store applications 14, databases 15, and operating systems 16. In preferred embodiments of the invention, the operating system 16 is a windowing operating system, such as RedHat® Linux or Microsoft® Windows98, although the invention may be used with other operating systems as well. Among the applications stored in memory 12 is a programming environment 17 and source files. Programming environment 17 compiles the source files written in a language that creates the output generated by embodiments of the present invention. In the preferred embodiment of the invention, this language is Curl™, developed by Curl Corporation of Cambridge, Mass. The programming language is based upon a language developed at Massachusetts Institute of Technology and presented in "Curl: A Gentle Slope Language for the Web," *WorldWideWeb Journal*, by M. Hostetter et al., Vol II. Issue 2, O'Reilly & Associates, Spring 1997.

Computer 1 also includes display interface 20, keyboard interface 21, computer bus 26, RAM 27, and processor 29. RAM 27 contains an error checker 23 for performing compile-time checking of unit designations for operations on operands. Operands, with unit designations, and operations that are performed on the operands are stored in the operands and operations module 25. Processor 29 preferably comprises a Pentium II® (Intel Corporation, Santa Clara, Calif.) microprocessor or the like for executing applications, such those noted above, out of RAM 27. Such applications, including the programming environment and/or embodiments of the present invention 17, may be stored in memory 12 (as above). Processor 29 accesses applications (or other data) stored in memory 12 via bus 26.

Application execution and other tasks of Computer 1 may be initiated using keyboard 6 commands from which are transmitted to processor 29 via keyboard interface 21. Output results from applications running on Computer 1 may be processed by display interface 20 and then displayed to a user on display 5. To this end, display interface 20 preferably comprises a display processor for forming images based on image data provided by processor 29 over computer bus 26, and for outputting those images to display 5.

An embodiment of the present invention is a system and method for manipulating, storing and retrieving variables that include a value and an underlying representation for the units represented by the value of the variable. Many methods exist for representing convention values in a computer and these methods are utilized in the invention.

Fixed-point or floating-point representations are commonly used to encode numbers. Fixed-point numbers are encoded by storing the integer part and the fractional part of a number in an integers contiguous memory. Floating-point numbers are encoded in a logarithmic fashion, with two fixed-point parts: one to represent the mantissa and one for the exponent. For a given bit size, fixed-point representation typically has greater precision and floating point has greater range. The IEEE floating point is a standard implementation of floating point numbers. Ordinary integers can be considered a subset of fixed-point notation, where 0 bits are devoted to the fractional part of a number.

Strings are used commonly to encode Text. A string is a series of characters placed in contiguous memory cells, with either a fixed-point number indicating the number of characters, or a special, termination character at the end of the string.

Pointers encode references to other values. Pointers are typically encoded as the address in memory of the value they reference. Pointers are useful for sharing a single data structure instance between multiple other structures.

We combine these basic value representations to create a new structure, a Quantity, that is suitable for encoding:

Ordinary floating point numbers,

Fundamental physical quantities such as measurements of distance or time,

Defined, non-physical quantities such as angular measure or percentage,

Physical quantities derived from (2) and (3), such as measurements of force or voltage, and Undefined or relative quantities represented by a magnitude and a unit string, such as a number of pixels, dollars, or people.

This structure may be implemented as part of the internal mechanism of the processor, as a basic data type of a language, or as a high level class in an object oriented language. Such a representation may be of practical importance in creating programs that operate on such numbers. For example, scientific data sets and business spreadsheets often contain measurements of the types listed above. The representations described in the next section may be suitable for encoding such numbers in a compact manner that enables efficient computation and detects errors caused by operation in incompatible units. For example, 3 inches+2 seconds is an error because the kind of units in the two quantities are not capable of being summed.

We divide the set of Quantities into two groups—known and unknown. A known Quantity represents a physical quantity, as defined by the International System (SI). When representing a known physical quantity, operations such as conversion between different types of units, arithmetic, and comparison can be performed, and the proper handling, including error generation, of the units will occur automatically. For example, an error will be generated if you attempt to add 3 cm to 2 s {3 cm+2 s} because the units do not match for this operation; whereas, if the same numbers are multiplied, the units will be multiplied {3 cm*2 s=6 cm*s}. A wide range of known unit types are recognized by the library, including all of the SI units.

Unknown Quantities holds a number and a "tag." When an unknown Quantity is used, a limited number of operations may be performed like reading the tag and reading the value. Context sensitive units (pixels), obscure/non-standard units (Smoots), and ill defined units (months) are not recognized and considered "unknown units" by the system. Quantities with these types of units can be constructed, but the operations that can be performed on them are limited. For example, pixels may be added to pixels, but pixels cannot be divided or multiplied by any other kind of units. To support unknown units, methods are provided to support additional conversion factors enabling conversion from unknown types of units to known types where the definition is supplied at conversion time.

Once created, Quantities may be used in equations in the same fashion as is natural for a typical numeric value or variable. Thus, the normal arithmetic operators (+,−, *, /, ^) are available, and allow interoperation with other numeric types by accepting either a Quantity or a Numeric Type as an argument. Similarly, the normal comparisons (>, <, >=, <=, =) are also supported between Quantities and between Quantities and numbers.

By using a Quantity to represent a physical quantity in an equation, certain types of errors can be signaled that would not be available if a conventional variable or numeric value were used in the Quantity's place. Thus, performing an inappropriate operation (e.g. {3 cm+4 sec}) with a Quantity can result in a runtime or compile time math error, similar in spirit to the way that dividing a numeric value by 0 would result in an error.

In the description below, the following technical terms are used:

Quantity

A Quantity is a value with an associated unit designation. The unit designation includes a Kind of Unit and a Type of Unit as defined below.

Kind of Unit

In general, a Quantity has a Kind of Unit that represents the nature of what the Quantity measures. Two units are of the same Kind of Unit if it is possible to convert between them. Examples of Kinds of Units include distance, time, temperature, unitless etc. Celsius and Kelvin are the same Kind of Unit (temperature) and thus each can be converted to the other representation.

Type of Unit

A Quantity also has a Type of Unit that represents the actual measurement unit for measuring the Quantity's Kind of Unit. Example Types of Units for the Kind of Unit "distance" include m (meters), in (inch), cm (centimeter) etc.

Dictionary

A list of units and their known synonyms are defined by the system for use in Quantities. Table I includes at least a partial listing of known units (and their synonyms) in the current embodiment of the invention.

TABLE I none value unitless unitless-constant
% percent
frame frames f
rad radians radian
degree deg degrees
m meter meters
mm millimeter millimeters
cm centimeter centimeters
km kilometer kilometers
in inch inches
ft foot feet
point points pt
gdim gdims
mi mile miles
A ampere amp amps Amperes Ampere amperes
kelvin Kelvin K kelvins Kelvins
s sec seconds second
ms msec milliseconds millisecond
min minutes minute
h hr hour hours
kg kilogram Kilogram Kilograms kilograms
g gram grams
pound pounds lb lbs # avoirdupois-pound avoirdupois-pounds dry-pounds dry-pound

TABLE I-continued candela candelas cd candle candles
liter l L liters
cc cubic-centimeter cubic-centimeters
mL milliliter milliliters
Bq becquerel becquerels Hz hertz
dots dot
dpi dots-per-inch
fps
pair brace yoke pr
hundred thousand million billon trillion quadrillion quintillion
mole moles
arcminute arcminutes
arcsec arcsecond arcseconds
pm picometer picometers bicron bicrons
dm decimeter decimeters
dkm dekameter dekameters
hm hectometer hectometers
angstrom angstroms
didot didots
agate agates
cicero ciceros
pica picas
digit digits
button-measure button-measures
line lines
barleycorn barleycorns
nail nails
palm palms
hand hands
pace paces
shaftment shaftments
link links
span spans breadth
cubit cubits
yd yard yards
fth fathom fathoms fath
goad goads
rod rods pole poles
chain chains
furlong furlongs fur
shackle shackles
nmi NM nautical-mile naut-mile nautical-miles
league leagues
aln alen
arpent arpents
arshin
braccio
Celsius celsius
Fahrenheit fahrenheit
watch watches
bell bells
d day days
fortnight fortnights
a year y years yr
aeon aeons eons eon
amu u atomic-mass-unit atomic-mass-units
cantar cantars
quintal quintals
mph miles-per-hour mile-per-hour
kph kilometers-per-hour kilometer-per-hour
candlepower cp
steradian Steradian Steradians steradians sr
square-meters square-meter
square-miles square-mile
acre acres Acres Acre ac
are ares a
barn barns
CCF
gallon gal gallons
dry-gallon dry-gal dry-gallons
imperial-gallon imperial-gallons
acre-foot acre-feet ac-ft
acre-inch acre-inches ac-in
barrel barrels bbl bo
barrel-bulk
BF fbm bd-ft board-foot board-feet
bu bushels bushel
amber ambers
anker ankers

TABLE I-continued aume aumes
breakfast-cup breakfast-cups
bucket buckets
amagat amagats
Bq becquerel becquerels Hz hertz
coulomb Coulomb coulombs Coulombs
N newton newtons Newton Newtons
J joule joules
V volt Volt Volts volts
watt watts Watts Watt W
lumen lm lumens
lux lx asb apostilb apostilbs
foot-candle foot-candles fc
amp-hr ampere-hour ampere-hours A-h
At ampere-turn ampere-turns
dyne dynes
lbf
pdl pl poundal poundals
ohm Ohm Ohms ohms
kiloPascals kPa kiloPascal
atm atmosphere atmospheres
bar bars b
Pascals Pa Pascal pascal pascals
barye ba baryes
Btu British-Trade-Unit heat-unit heat-units
cal calorie calories gram-calorie small-calorie
gram-calories small-calories
Calorie Calories Cal kilogram-calorie kilogram-calories
large-calorie large-calories Known Unit
A unit that is included in the Dictionary.
Unknown Unit
A unit that is not included in the Dictionary.

In one embodiment of the present invention, the system and method for variables representing Quantities is implemented in an object oriented language from Curl Corporation. The language allows the creation of objects and has similar capabilities to those found in languages such as Scheme, Lisp and C++.

A variety of structures are defined and utilized in this embodiment of the invention. The structures include:

Quantity Structure

Figure 3:
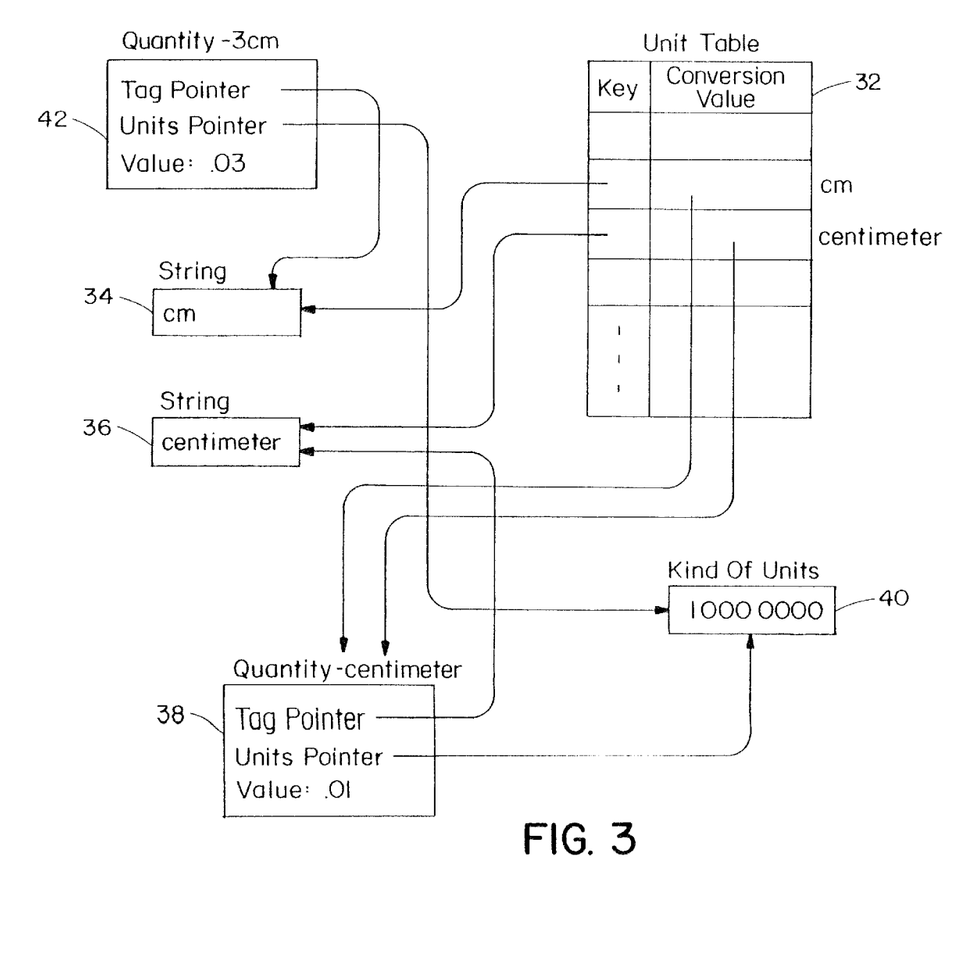
FIG. 3 illustrates data structures and methods in an embodiment of the present invention.

As illustrated in FIG. 3, a Quantity Structure 38,42 contains three parts: an internal-value, an internal-units pointer and an internal-tag pointer. The internal-tag pointer points to a string 36,34 that maintains the type of units to be displayed. The internal-units pointer points to a KindOfUnits instance, and represents the kind of units. The internal-value is a 64 bit floating point number that stores either the value of the Quantity in the SI units specified by the internal-units, or the value of the Quantity in internal-tag units if the internal-units pointer is void. The internal tag pointer is optional and is often disregarded in favor of heuristics and user preferences when printing.

KindOfUnits

A KindOfUnits 40, pointed to by a Quantity's internal-units pointer, stores the exponents on the seven SI fundamental units (meters, kilograms, seconds, candelas, Kelvin, and Ampere), the exponent on radians and an exponent on an amount of substance. A KindOfUnits measuring force (Newtons=kg*m/s$^2$) would be represented as m$^1$, kg$^1$, s$^{-2}$, cd$^0$, K$^0$, A$^0$, rad$^0$ and amount$^0$ for a KindOfUnits vector of 11–20000. In the KindOfUnits structure, the exponent for each unit is presented in eight bits, for a total entry of 8×8=64 bits. As discussed below, uniformly designating the units by exponents presented in subunit fields for the available standard units allows mathematical operations to be performed on unit designations as they are performed on values. Such operations both check for compatibility of units in specified operations and determine resultant unit designations.

The underlying system defines a set of basic quantities such as listed in Table I. For example, the system includes a quantity centimeter. Further, the system identifies other strings which apply to that basic quantity such as cm and centimeters. The user of the program defines new quantities in terms of the basic quantities. For example, when the user identifies a quantity 3 cm the system relies on the basic quantity centimeter to set up the new quantity 3 cm. That process is facilitated by a unit table 32 illustrated in FIG. 3.

The unit table comprises pairs of key pointers and conversion value pointers. A key pointer is provided for each string identified by the system. For example, for the cm pair, the key pointer points to the string 34 "cm." Similarly, the key for the centimeter pair points to the string 36 "centimeter." The conversion value pointers for both entries point to the same Quantity 38 installed in the system. That Quantity includes a tag pointer to the string 36, the preferred string for use in printing the value unless otherwise indicated in another Quantity. The quantity also includes a value which is the scale factor to be applied to the basic SI unit meters to define the Quantity centimeter. From the basic meter Quantity one multiplies by 0.01 to obtain a centimeter. The units pointer points to a KindOfUnits entry 40 which is used for all distance Quantities. The first of the 8 digits in the KindOfUnits vector is the distance digit which, in SI units, is in meters. For all distance Quantities, the meters exponent is 1, and the digit in the KindOfUnits vector 40 is 1.

When the user of the language establishes a quantity 3 cm, a new quantity 42 is created. The system takes the tag "cm" and walks through the unit table comparing the tag to each string to which the keys point. When the string 34 is reached, an equality is noted, and the key pointer from the unit table to that string is taken as the tag pointer in the new quantity 42. Further, the corresponding conversion value pointer in the unit table points to the centimeter quantity 38. That quantity includes the conversion factor 0.01 by which the value 3 is multiplied to provide a value in the quantity 42 of 0.03. Further, the new quantity shares the KindOfUnits of the basic quantity 38 so the units pointer of Quantity 38 is also inserted as the units pointer of the new quantity 42.

Certain conversions, such as from degrees F to degrees C cannot be made with a simple scale factor. In those cases, the conversion value pointer in the unit table is not to a Quantity but rather to a routine. That routine performs the necessary conversion and provides the appropriate pointers to the KindOfUnits and string.

Any of the quantities listed in Table I can be defined in terms of one or more of the basic KindOfUnits. For example, 1 volt=1 kg-m/(sec$^2$A) for a KindOfUnits vector of 11–200100. As another example, 1 U.S. dry gallon is defined as 4.404884 liters and 1 liter=0.1 meter$^3$. Accordingly, a U.S. dry gallon can be defined by the value 0.0004404884 and the KindOfUnits vector 30000000.

The Quantity structure can also be used in situations where the system does not have an underlying basic quantity previously defined. In that case, the tag pointer serves as a definable units designation and the units pointer is void. The value in the quantity would simply be the value provided by the user in association with that definable units designation.

The conventional operations available for a numeric value are also available for a Quantity, with certain limitations as described below.

Operations on Quantities

Addition and Subtraction

Quantities may be added to each other and subtracted from each other. The limitation is that the units (i.e. distance added to distance, weight to weight etc.) for each Quantity must match for the operation. While the scale used for the units need not match (i.e. meters and feet), the kind of unit must match (i.e. distance and distance). Thus, 1 m can be added to 1 ft but 1 m cannot be added to 1 s. The scale need not match because both values are converted to SI units before the operation as discussed above.

For example, the steps performed to add two Quantities include:

1) Retrieving the units for each of the Quantities as found in either the KindOfUnits pointed to by the internal-units or internal-tag if the internal units pointer is null; and 2) Comparing the units retrieved to ensure they are equivalent, and if so, performing the addition on the internal-values. Because of the 64 bit KindOfUnits representation, the comparison of units reduces to a simple comparison of bits in two vectors.

Multiplication and Division

Quantities may be multiplied to each other and divided from each other. Each Quantity can have different underlying units (i.e. distance multiplied by mass, distance divided by time etc.) for the operation. In addition, the scale used for the units need not match (i.e. meters and feet). Thus, 1 m can be multiplied by 1 ft and 1 m can be divided by 1 s. The resulting Quantity contains the combined units designation (if any) resulting from the operation.

For example, the steps performed to multiply two Quantities include:

1) Retrieving the units for each of the Quantities as found in either the KindOfUnits pointed to by the internal-units or internal-tag if the internal units pointer is null; and 2) Comparing the units retrieved to determine if they are known types of units, and if so, performing the multiplication on the internal-values and performing an addition on the exponent-values found in the KindOfUnits entry pointed to by the internal-units; or 3) Comparing the units retrieved to determine if one is an unknown type of units and the other is unitless, and if so, performing the multiplication on the internal-values and using the internal-tag of the Quantity having the unknown type of units.

As an example of multiplying two known types of units, the multiplication of 3 m times 3 m/sec will multiply the internal values 3×3. The KindOfUnits entries will present a 1 in the distance field of each and a −1 in the time filed of only one. Adding the two entries results in a 2 in the distance field and −1 in the time filed for the proper result of m$^2$/sec.

Logical Operations

Logical operations such as <, <=, >, >= and equal are also supported for Quantities. As in the case for the mathematical operations addition and subtraction, the units specified for each Quantity within a logical operation must match while the scale need not. Thus, 1 m>1 ft is allowed by 1 m>1 s is not.

For example, the steps performed to test one Quantity being greater than a second Quantity include:

1) Retrieving the units for each of the Quantities as found in either the KindOfUnits pointed to by the internal-units or in the internal-tag if the internal units pointer is null; and 2) Comparing the units retrieved to ensure they are equivalent, and if so, performing the logical operation on the internal-values.

Conversion Operations

The units designated for a given Quantity can be converted between unit systems. For instance, a distance Quantity containing a value specified in meters can be converted to feet.

Printing Operations

There are two steps to printing (including display): selecting the appropriate units to display the Quantity as, and converting the quantity to those units to print. Different sources can provide guidance to what units to use for printing.

In one embodiment, the invention determines the units by looking at the following sources in the order given:

1) if the Quantity has a valid internal-tag, it is used.
2) otherwise, the Quantity is converted to the unit specification found in alternate sources. For instance, the user may have a series of preferences that are initialized when the user accesses the program. The preferences may specify a preferred default unit family (i.e. the SI units) or specify a default for each kind of unit (i.e. distance in meters). If the user preferences do not provide information for determining the units to use, then the system can look to information specifying the locale of the computer operating the system. For instance, many operating systems are able to track and specify the physical location of the machine, for instance personal computer running the Microsoft Windows operating system. By knowing the location, the invention can determine the units used for that location. So, a European based computer will utilize metric system of units while American based computers will utilize U.S. system of units.

The steps to print a Quantity thus are:

1) Look up conversion factor for internal-tag in the units table. If the conversion factor is Quantity, divide x.value by conversion.value and print that number; then print x.tag. If the conversion factor is a procedure, call with the "inverse" option, that is, call the inverse conversion, and print the result; then print x.tag.

Compile Time Unit Checking

It is possible to integrate the notion of Quantity types and kinds into the type system to get compile-time checking for expression evaluation and argument passing. The first order implementation of this notion, using known compile time type checking, is to make Quantity a language type, like integer or string. Declaring an argument of language-type Quantity allows any value stored in a Quantity to be checked for prior to being accepted by a procedure. In the following pseudo-code samples a Quantity will be expressed as a value concatenated with unit designation (e.g., "3 centimeters" will be represented as "3 cm"). For example, the procedure, my-proc, can be defined to accept an argument, x, defined as a Quantity. Thereafter, any valid Quantity (e.g., "3 cm", "2 ft", "3 sec") would be legal to assign to x, but assigning the string "hi" would not.

Example:

{define {my-proc x:Quantity}}
{my-proc 3 cm} || legal
{my-proc 2 ft} || legal
{my-proc 7 sec} || legal
{my-proc "hi"} || illegal; not a Quantity. Compile time error The next level of type checking would be to make a conventional parameterized type declaration for quantities based on the kind of units. Let {Quantity-of kind-of-units} be a declaration for a language type where the Quantity type is unspecified, but the Quantity kind is equal to kind-of-units. Thereafter, any valid Quantity (e.g., "3 cm", "2 ft") of a specified kind (e.g., distance) would be legal to assign to x, but assigning the time Quantity "7 sec" or the string "hi" would not. Example:

{define-constant distance:KindOfUnits=1 m.kind-of-units}
{define {my-proc x:{Quantity-of distance}}}
{my-proc 3 cm} || legal
{my-proc 2 ft} || legal
{my-proc 7 sec} || illegal; wrong kind of units. Compile time error.
{my-proc "hi"} || illegal; not a Quantity. Compile time error.

Note that this requires type inferencing rules to be applied at compile time for the results of arithmetic operators. The type inferencing rules are:

{type-of {*q1 q2}}={Quantity-of {+q1.kind-of-units {q2.kind-of-units}}
{type-of {/q1 q2}}={Quantity-of {-q1.kind-of-units {q2.kind-of-units}}
{type-of {+q1 q2}}={type-of q1}={type-of q2}
{type-of {-q1 q2}}={type-of q1}={type-of q2}
{type-of {^qn}}={Quantity-of {*q1.kind-of-units n}}

The process of inferring types as a result of arithmetic operations is a standard part of compilation. For example, when an integer and floating point number are multiplied, the compiler must assign a type to the result.

Alternate implementations of units include making Quantity a defined class within the system. Declaring a variable to be an instance of the Quantity class allows any value stored in a Quantity to be checked prior to being passed as an argument to a procedure.

An operation on a Quantity may result in an automatic check of the unit designation, signaling an error condition for improper usage. Thus, a variable can be created in the system having a distance unit designation and the system will signal an error if an attempt is made to add to it a variable having a time unit designation. For example, 3 cm+2 sec is an error because the kind of units in the two Quantities are not capable of being summed. Whereas, if the same numbers are multiplied, the units can be properly multiplied as {3 cm*2 sec=6 cm*sec}.

By using a Quantity variable to represent a physical quantity in an expression, certain types of error detection can be achieved that would not be available if a conventional variable or numeric value were used in place of the Quantity. Thus, performing an inappropriate operation (e.g., {3 cm+2 sec}), with a Quantity, can result in a runtime or compile time error, similar in spirit to the way that dividing a numeric value by 0 would result in an error.

In the following examples, two types of error checking are illustrated: expression evaluation and assignment.

The first error condition is expression evaluation, it detects the incompatability of the addition operation in the expression "2 cm+3 sec". For example:

{define X:{Quantity-of distance}} || X is of kind "distance"
{X=2 cm+3 sec} || error; incompatible quantities The second type of error condition is assignment, it detects an attempt to store a quantity into a variable/argument not defined to store that kind of quantity. For example:

{define X:{Quantity-of distance}} || X is of kind "distance"
{X=3 sec} || error; incompatible quantities In a further embodiment of the invention, an extension is made to the basic system to allow the addition of partial definitions of units in the Units-Table, and to specify ways in which the resulting underdefined Quantites can be used to provide unit checking. The lack of a conversion factor prevents an underdefined Quantity from being converted to canonical units or to an exactly defined Quantity; however, the KindOfUnits entry in the Unit-Table allows unit checking during these operations.

Checking of both a Quantity unit kind and a Quantity unit type is possible. Kind checking is generally preferred over type checking, where type checking is more strict and granular, kind checking provides more flexibility. Unit checking can detect an incompatible operation, as well as an overflow operation. An incompatibility occurs when operation on a Quantity would result in an undefined unit. For example, assigning the Quantity 2 sec to a procedure argument defined to receive a distance Quantity will signal an incompatibility error. Another example of incompatibility is the example of evaluating the expression: 3 centimeters plus 2 seconds, {3 cm+2 sec}, discussed above, where the result unit kind would generate an undefined Quantity unit and thus would signal an error. Overflow operations occur when the result of an operation would generate a Quantity unit that is unrepresentable in the KindOfUnits vector. These errors can also be signaled at compile-time.

The benefits of compile-time checking of Quantity units include a faster run-time system for users. Because proper results are guaranteed at compile-time, some run-time checking can be removed. This results in less run-time code, so the run-time system can be smaller, requiring less memory to run as well as to store.

Programmers in the system are also benefitted by compile-time Quantity units checking because they receive timely feedback on the correctness of their programs. An error report at compile-time allows a programmer to correct inaccuracies in a program at an earlier stage of development than an error report produced at run-time.

Extensions for Under-defined Quantities

The basic unit handling system described above allows for two kinds of Quantities: known and unknown. These are stored in a single implementation, the Quantity class, where state bits differentiate known from unknown. In this system, a known Quantity has a known value, unit specification, a tag indicating display preferences, and conversion procedures from and to canonical units. An example of a known Quantity is 3 meters. This is known because "meters" are well-defined units. An unknown quantity has only a known value and a tag identifying the type of unknown unit. An example of an unknown Quantity is 3 pixels. This is unknown because there is no well-defined conversion factor from "pixels" to canonical distance units ("meters"). Known Quantities can generally be operated on using arithmetic and comparison operators. Unknown Quantities can only be operated on in very limited circumstances because there are no conversion procedures or ways of performing unit-checking for operators without any unit information.

In a further embodiment of the invention, an extension is made to this basic system to allow the addition of partial definitions of units to the Units-Table, and specify ways that the resulting under-defined units can be used to provide unit-checking. This allows some under-defined units, like "pixels", to be used in a wider set of circumstances than under the basic system. The extension for under-defined units uses the same framework as the basic unit handling system, but adds more classes and redefines the Quantity class to better use Object Oriented design principles to manage the increased complexity of the more powerful system.

Introducing Under-defined Quantities allows more complex expressions to be built using the Quantity system. In this extension, there are five major language types for handling Quantities:

Quantity
ExactlyDefinedQuantity
UnderDefinedQuantity
UnDefinedQuantity
QuantityExpression Quantity is the base-class for the other four classes, and is the only type that is visible to the programmer. The others are subclasses of Quantity that are used to indicate how much information is known about the units of a quantity. Object oriented design allows these sub-classes to override the methods of the Quantity super-class, so that all provide the same interface to the programmer.

An ExactlyDefinedQuantity is a type specifically for what were previously referred to as known Quantities. An ExactlyDefinedQuantity has a value.float in SI units, a units:KindOfUnits package, and a tag:String that maps to a conversion factor in the global Units-Table. An UnDefinedQuantity is what was previously referred to as an unknown Quantity, and contains a value:float that is not usually in SI units (i.e. it is not canonicalized), and a tag:String that does not map to a conversion factor in the global Units-Table. The kind of units is unknown for such a Quantity, so there is no property carrying unit information.

Figure 4:
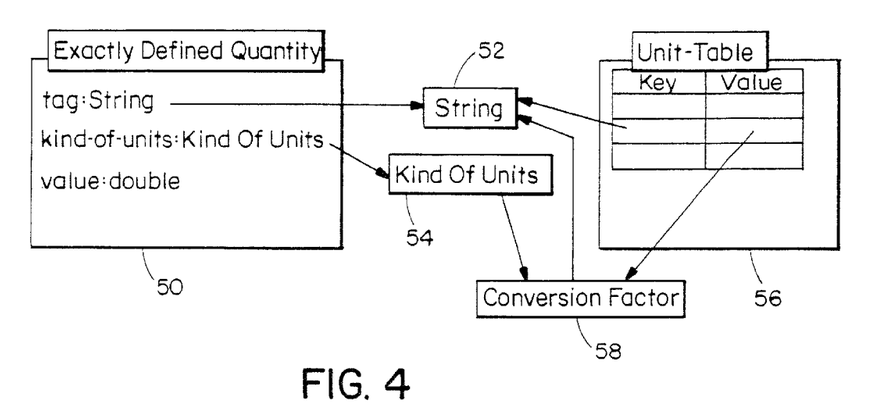
FIG. 4 illustrates the data structure associated with an exactly defined quantity in an embodiment of the present invention.

FIG. 4 shows the structure of an ExactlyDefinedQuantity, along with the relevant entry from Unit-Table. The ExactlyDefinedQuantity 50 contains three storage slots. Each storage slot has a name and a type, which are formatted as name:type in the diagram. The tag and kind-of-units slots are pointers to objects. The objects they point to are shown outside the ExactlyDefinedQuantity structure. Note that the String and the KindOfUnits objects 52 and 54 are shared between multiple data structures. These objects are immutable, so this sharing leads to memory efficiency without any danger of one structure corrupting the state of another. The Unit-Table 56 is depicted as a table with String key entries that map to value entries of type ConversionFactor. As discussed in previous sections, a ConversionFactor 58 may be either a Quantity or a procedure. Both forms specify a KindOfUnits, so that pointer is drawn coming out of the conversion factor box. Note that the ExactlyDefinedQuantity and the ConversionFactor to which its tag maps in the UnitTable both point at the same KindOfUnits.

An UnderDefinedQuantity has the same representation as an ExactlyDefinedQuantity, but has different semantics. In the Unit-Table, the tag of an UnderDefinedQuantity does not map to a conversion factor; instead it maps to a KindOfUnits. Like the UnDefinedQuantity, the value property is not canonicalized. Such a Quantity is essentially an UnDefinedQuantity where a small amount of extra information is available: the kind of units the tag declares.

UnderDefinedQuantities are used when it is known what kind of units a unit represents, but the conversion factor is subject to change. For example, a number in pixels always measures distance, but a conversion from pixels to meters requires additional information: the screen resolution. Monetary units fall into this category as well because they are subject to changing currency conversion rates. A unit like "pixels" can be defined in the Unit-Table to map to distance units, but with no conversion factor. In a system with such a definition in the Unit-Table, 3 pixels is an UnderDefinedQuantity, not a UnDefinedQuantity, and more operations can be performed on it.

Figure 5:
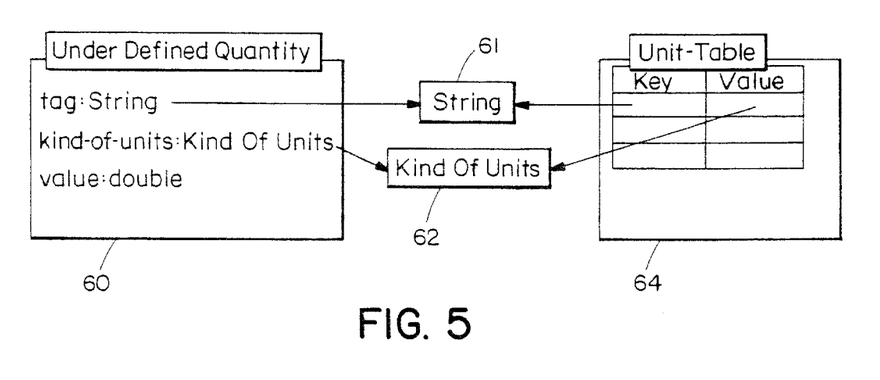
FIG. 5 illustrates the data structure of an underdefined quantity of the invention.

FIG. 5 shows the internal structure of an UnderDefinedQuantity 60 and a relevant entry in the Unit-Table 64. Note that the storage scheme is identical to that of the ExactlyDefinedQuantity. An ExactlyDefinedQuantity contains a tag that maps to a ConversionFactor in the Unit-Table. However, an UnderDefinedQuantity contains a tag that maps to a KindOfUnits 62 in the Unit-Table 64. The lack of a ConversionFactor prevents an UnderDefinedQuantity from being converted to canonical units or to an ExactlyDefinedQuantity. The KindOfUnits entry in the Unit-Table allows unit-checking during operations, however.

Figure 6:
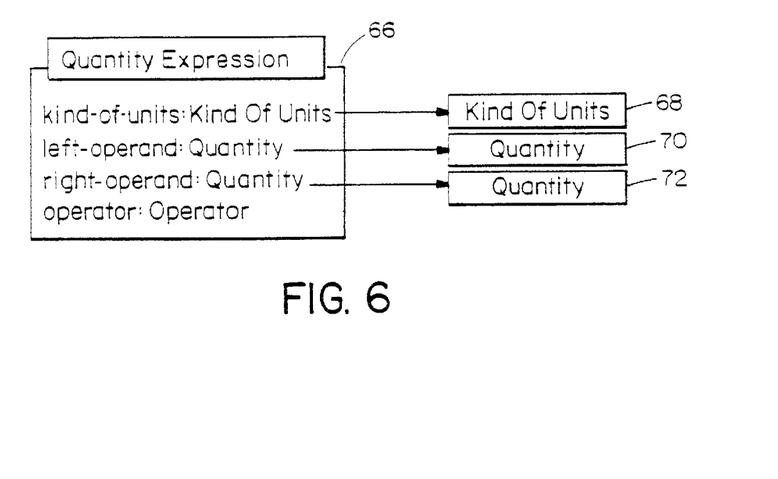
FIG. 6 illustrates the data structure of a quantity expression of the invention.

A QuantityExpression defers the computation of an algebraic expression containing a mixture of ExactlyDefinedQuantities and UnderDefinedQuantities until the UnderDefinedQuantities inside it can be exactly expressed. A QuantityExpression 66, illustrated in FIG. 6, contains the input to an operator: the operator itself, left-hand operand 70, and a right-hand operand 72, both of type Quantity. It also contains a pointer to a KindOfUnits structure 68 for unit checking purposes. Note that because QuantityExpression is a subclass of Quantity, QuantityExpressions can be nested. That is, the left-operand and right-operand slots of a QuantityExpression may be other QuantityExpressions. They will never be circular dependencies where following such a chain will lead around in a loop; such a structure has been corrupted and is an error.

Algebra on ExactlyDefinedQuantities

The algebraic operators for multiplication, division, subtraction, negation, addition, and exponentiation can be applied to ExactlyDefinedQuantities. In each case, the result is an ExactlyDefinedQuantity. These operations are all performed in constant time. Specifically, the units or combination of units does not affect the time needed for the computation, nor does the preferred units of the arguments. The results of the operations $3(kg*m/s^2)*7(W*s)$ and $4$ seconds $+2$ hours can be computed in the same amount of time as $7$ s$+3$ s. Three mechanisms make this possible. First, no unit conversion occurs when performing algebra because all ExactlyDefinedQuantities are converted to canonical units when they are constructed. The Quantities 4 seconds and 2 hours are both stored in seconds, so no conversion needs to occur when they are added. Second, units are stored in a canonical exponential form inside of a KindOfUnits structure. The result of adding two Quantities has the same KindOfUnits as each operand. Multiplying Quantities adds the values inside the KindOfUnits structure; division subtracts. During algebraic computation, only algebraic operators are applied to KindOfUnits; no string concatenation or other linear time operation is performed to derive the KindOfUnits for the result. Third, the tag is destroyed during multiplication, division, and exponentiation, and are not restored until a heuristic generates a new tag during printing. If the tag was to be preserved during these operations, a linear time string concatenation (plus a linear time unit cancellation) would be performed. An extended implementation could trade off efficiency for usability by performing these slow operations, but the implementation described here does not.

Multiplication $eq_3 = eq_1 * eq_2$:
$eq_3$.value=$eq_1$.value*$eq_2$.value
$eq_3$.units=$eq_1$.units+$eq_2$.units
$eq_3$.tag=nul Division $eq_3 = eq_1 / eq_2$:
$eq_3$.value=$eq_1$.value/$eq_2$.value
$eq_3$.units=$eq_1$.units-$eq_2$.units
$eq_3$.tag=null Addition $eq_3 = eq_1 + eq_2$:
assert($eq_1$.units==$eq_2$.units)
$eq_3$.value=$eq_1$.value+$eq_2$.value
$eq_3$.units=$eq_1$.units
$eq_3$.tag=$eq_1$.tag Subtraction $eq_2 = eq_1 - eq_2$:
assert($eq_1$.units==$eq_2$.units)
$ew_3$.value=$eq_1$.value-$eq_2$.value
$eq_3$units=$eq_1$.units
$eq_3$.tag=$eq_1$.tag Negation $eq_2 = -eq_1$:
$eq_3$.value=-$eq_1$.value
$eq_3$.units=$eq_1$.units
$eq_3$.tag=$eq_1$.tag Exponentiation $eq_3 = eq_1 \char`\^ eq_2$:
assert($eq_2$.units==UNITLESS)
$eq_3$.value=$eq_1$.value^$eq_2$.value
$eq_2$.units=$eq_1$.units*$eq_2$.value
$eq_3$.tag=null Algebra with Mixed Subclasses Algebraic operators can also be used with any combination of ExactlyDefinedQuantities, UnderDefinedQuantities, and QuantityExpressions. When an UnderDefinedQuantity is involved in a computation, whether explicitly or nested inside a QuantityExpression, there is not enough information to actually perform the algebra and produce a single ExactlyDefinedQuantity as a result. For example, the expression 3 pixels+1 meter cannot be fully evaluated into a single ExactlyDefinedQuantity until a conversion factor from pixels to canonical distance units (meters) is known. Because of this lack of information, the results of many algebraic operations on mixed Quantity subclasses result in QuantityExpressions. A QuantityExpression simply maintains pointers to the arguments to the operator until it is provided with conversion factors for all of the UnderDefinedQuantities and forced to evaluate itself. The following table gives the result type of an algebraic operation on mixed types. Note that almost all cases result in a QuantityExpression. Although the exact value of a QuantityExpression is not known until conversion factors are provided to it, the KindOfUnits for a QuantityExpression is known, so in each of these cases, units checking occurs at the point of the algebraic expression.

|  | ExactlyDefinedQuantity | UnderDefinedQuantity | QuantityExpression |
|---|---|---|---|
| ExactlyDefined Quantity | ExactlyDefinedQuantity | QuantityExpression or UnderDefinedQuantity* | QuantityExpression |
| UnderDefined Quantity | QuantityExpression or UnderDefinedQuantity* | QuantityExpression, UnderDefinedQuantity**, or ExactlyDefinedQuantity*** | QuantityExpression |
| Quantity Expression | QuantityExpression | QuantityExpression | QuantityExpression |

*UnderDefinedQuantity when the ExactlyDefinedQuantity is unitless and the operator is multiplication or division.
**UnderDefinedQuantity when the operator is addition or subtraction
***ExactlyDefinedQuantity when the operator is division and the UnderDefinedQuantitys have the same tag, so the units divide out.

When the result of an operator is a QuantityExpression, the operator and its inputs are encapsulated in the QuantityExpression that is the result. The only computations that are performed are a check that the units of the inputs are compatible for the given operator, and determination of the units of the output. The algorithms for applying algebraic operators to mixed Quantity subclasses are given below. Not explicitly shown are the exceptional cases noted in the above table with asterisks. For these cases, a more constrained result than a QuantityExpression can be produced. These cases occur when one operand is under defined. The * case refers to an UnderDefinedQuantity being multiplied or divided by a unitless ExactlyDefinedQuantity, such as 15 cows*3. In this case, the result can be computed by multiplying the ExactlyDefinedQuantities by the UnderDefinedQuantity's value because no understanding of the conversion factor for the UnderDefinedQuantity is required. The  case refers to addition or subtraction between UnderDefinedQuantities with identical tags. As in the previous case, the conversion factor is not needed because no conversion takes place. Finally, the * case refers to division between UnderDefinedQuantities with identical tags, where the units divide out. Again, this can be more constrained because no conversion factors are necessary. All of these cases are essentially optimizations and are not necessary for a naïve implementation.

Addition $qe=q_1+q_2$
$assert(q_1.units==q_2.units)$
$qe.units=q_1.units$
$qe.left-operand=q_1$
$qe.right=operand=q_2$
$qe.operator=+$ Subtraction $qe=q_1-q_2$
$assert(q_1 units==q_2.units)$
$qe.units=q_1-operand=q_1$
$qe.left-operand=q_1$
$qe.right-operand=q_2$
$qe.operator=-$ Negation $qe=q_1$
$qe.units=q_1.units$
$qe.left-operand=NULL$
$qe.right-operand=q_1$
$qe.operator=-$ Multiplication $qe=q_1*q_2$
$qe.units=q_1.units+q_2.units$
$qe.left-operand=q_1$
$qe.right-operand=q_2$
$qe.operator=*$ Division $qe=q_1/q_2$
$qe.units=q_1.units-q_2.units$
$qe.left-operand=q_1$
$qe.right-operand=q_2$
$qe.operator=/$ Exponentiation $qe=q_1\hat{\ }eq_2$:
$assert(eq_2.units==UNITLESS)$
$qe.units=q_1.units*eq_2.value$
$qe.left-operand=q_1$
$qe.right-operand=eq_2$
$qe.operator=\hat{\ }$ Note that all of these operations are constant time and constant space.

Converting UnderDefinedQuantities and QuantityExpressions to ExactlyDefinedQuantities UnderDefinedQuantities contain a value, unit tag, and have a known KindOfUnits. The actual conversion factor between the unit tag and canonical units is subject to change, however. For example, 3 pixels is an UnderDefinedQuantity. The system can identify that this represents a distance, but how much distance is unknown. An UnderDefinedQuantity can be converted to an ExactlyDefinedQuantity by providing a conversion factor. The convert-to method performs this function.

Quantity.convert-to has the syntax:

{Quantity.convert-to [tag$_1$[tag$_2$ . . . ]] [define-tag$_1$=cf$_1$[define-tag$_2$= cf$_2$. . . ]]}

Strings tag$_x$ are choices of output tags, define-tag$_y$ are keyword argument names that provide temporary mappings of tags to ConversionFactors cf$_y$. The result of this method is an ExactlyDefinedQuantity with the same kind-of-units as the original object, a tag chosen from tag$_x$, and value of the original Quantity's value processed by appropriate ConversionFactors. For example, the result of:

{3pixels.convert-to "points" pixels=2points} is 6 points. Semantically, the mapping of "pixels" to distance KindOfUnits in the Unit-Table is replaced with a mapping of "pixels" to 2 points, 3 pixels is converted to "points", then the original mapping of "pixels" to distance KindOfUnits is restored. If "pixels" had not been bound and the lookup had occurred, an error would have been thrown.

Note that the syntax above, with keyword arguments and undefined numbers of arguments, is specific to the features of the Curl language. In another language, the same purposes could be accomplished using arrays of Strings and values.

Figure 7:
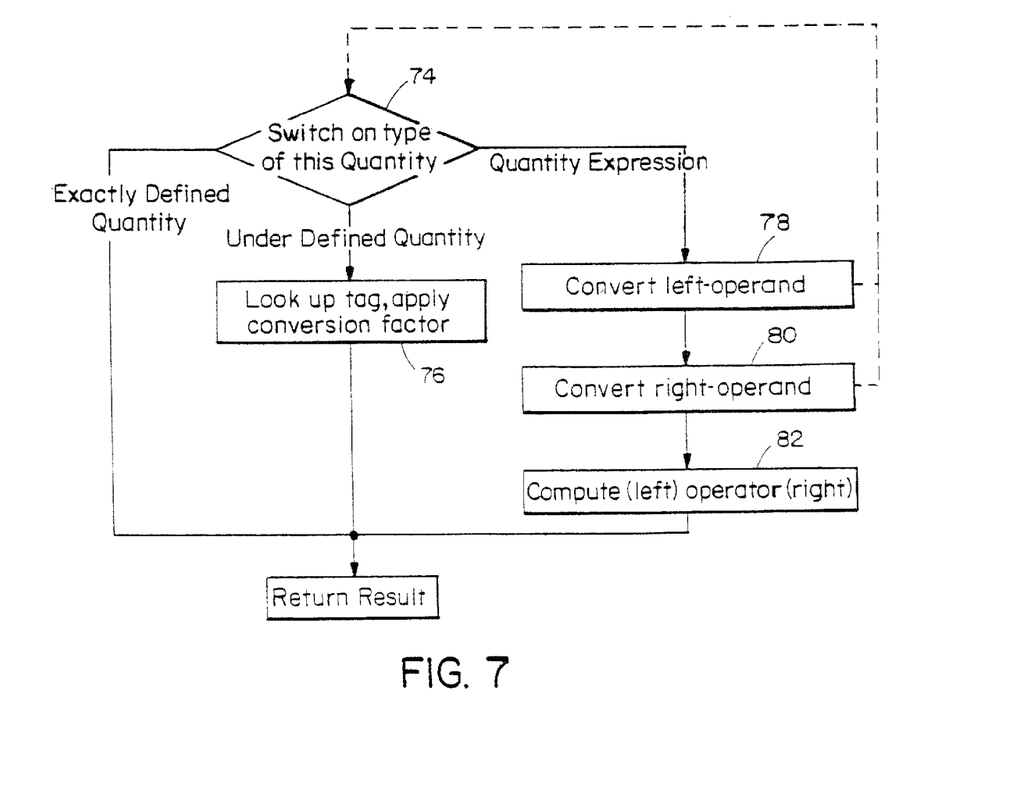
FIG. 7 illustrates a process of converting underdefined quantities and quantity expressions to exactly defined quantities.

FIG. 7 illustrates the conversion process based on the type of quantity at 74. With exactly defined quantities, no conversion is required in the process since the conversion was performed when the quantity was first defined. An underdefined quantity is simply converted at 76 with the conversion factor which has been supplied. QuantityExpressions can be converted to ExactlyDefinedQuantities by a recursive process. First the left-operand is converted at 78; then the right-operand is converted at 80. Finally the results are combined at 82 according to operator. The process is recursive because either operand may be a QuantityExpression as well. In FIG. 7, this recursive relationship is denoted by a dotted line.

While this invention has been particularly shown and described with references to preferred embodiments thereof, it will be understood by those skilled in the art that various changes in form and details may be made therein without departing from the scope of the invention encompassed by the appended claims.

What is claimed is:

1. In a data processing system, a method of error checking comprising the steps of:
   defining an operation on at least one operand, the at least one operand having unit designation, the operation having a defined result having a unit designation; and
   performing, at compile-time, a unit error check on the operation and
   detecting an error condition, based upon the operation, by comparing the unit designation of the at least one operand to the unit designation of the defined result.

2. The method of claim 1 further comprising the step of:
   reporting an error message when the error condition is detected.

3. The method of claim 1 wherein each of the at least one operand has a unit designation.

4. The method of claim 1 wherein:
   the unit designation of the at least one operand is stored as a vector of exponents representing standard units of measurement;
   the unit designation of the defined result is stored as a vector of exponents representing standard units of measurement; and
   the step of detecting the error condition further comprises comparing the vector of exponents for the at least one operand to the vector of exponents for the defined result.

5. The method of claim 4 wherein the standard units are defined by the SI units system.

6. The method of claim 1 wherein the defined result is inferred from the operation using type inferencing rules.

7. The method of claim 1 wherein the error check determines that the unit designation of the at least one operand is incompatible with the unit designation of the defined result based upon the operation.

8. The method of claim 1 wherein the error check determines that the operation would result in a unit underflow/overflow.

9. The method of claim 1 wherein the unit designation is defined as a kind of unit, the kind of unit representing the nature of what the unit designation measures.

10. The method of claim 1 wherein the unit designation is defined as a type of unit, the type of unit representing the actual measurement unit of the unit designation.

11. The method of claim 1 wherein the at least one operand is exactly defined, the exactly defined operand having a known value, a unit specification, a display preferences indicator, and conversion procedures from and to canonical units.

12. The method of claim 1 wherein the at least one operand is underdefined, the underdefined operand having a known value, a unit specification, and a known kind of units.

13. The method of claim 1 wherein the at least one operand is a quantity expression, the quantity expression comprising an expression operator, a left-hand operand having a unit designation, a right-hand operand having a unit designation, and a known kind of units.

14. An apparatus for error checking comprising:
   at least one operand having a unit designation;
   an operation on the at least one operand, the operation having a defined result having a unit designation;
   an error checker, performing, at compile-time, a unit error check on the operation; and
   a detector detecting an error condition, based upon the operation, by comparing the unit designation of the at least one operand to the unit designation of the defined result.

15. The apparatus of claim 14 further comprising:
   a reporter reporting an error message when the error condition is detected.

16. The apparatus of claim 14 wherein each of the at least one operand has a unit designation.

17. The apparatus of claim 14 wherein:
   the unit designation of the at least one operand is stored as a vector of exponents representing standard units of measurement;
   the unit designation of the defined result is stored as a vector of exponents representing standard units of measurement; and
   the detector detects the error condition by comparing the vector of exponents for the at least one operand to the vector of exponents for the defined result.

18. The apparatus of claim 17 wherein the standard units are defined by the SI units system.

19. The apparatus of claim 14 wherein the defined result is inferred from the operation using type inferencing rules.

20. The apparatus of claim 14 wherein the error check determines that the unit designation of the at least one operand is incompatible with the unit designation of the defined result based upon the operation.

21. The apparatus of claim 14 wherein the error check determines that the operation would result in a unit underflow/overflow.

22. The apparatus of claim 14 wherein the unit designation is defined as a kind of unit, the kind of unit representing the nature of what the unit designation measures.

23. The apparatus of claim 14 wherein the unit designation is defined as a type of unit, the type of unit representing the actual measurement unit of the unit designation.

24. The apparatus of claim 14 wherein the at least one operand is exactly defined, the exactly defined operand having a known value, a unit specification, a display preferences indicator, and conversion procedures from and to canonical units.

25. The apparatus of claim 14 wherein the at least one operand is underdefined, the underdefined operand having a known value, a unit specification, and a known kind of units.

26. The apparatus of claim 14 wherein the at least one operand is a quantity expression, the quantity expression comprising an operator, a left-hand operand having a unit designation, a right-hand operand having a unit designation, and a known kind of units.

27. A computer program product comprising:

a computer usable medium for error checking;

a set of computer instructions embodied on the computer usable medium, including instructions to:
  define an operation on at least one operand, the at least one operand having a unit designation, the operation having a defined result having a unit designation;
  perform, at compile-time, a unit error check on the operation; and
  detect an error condition, based upon the operation, by comparing the unit designation of the at least one operand to the unit designation of the defined result.

28. A propagated signal carried on an electromagnetic waveform, the signal comprising a set of computer program instructions to:

define an operation on at least one operand, the at least one operand having a unit designation, the operation having a defined result having a unit designation;

perform, at compile-time, a unit error check on the operation; and detect an error condition, based upon the operation, by comparing the unit designation of the at least one operand to the unit designation of the defined result.

29. An apparatus for error checking comprising:

a means for defining an operation on at least one operand, the at least one operand having a unit designation, the operation having a defined result having a unit designation;

a means for performing, at compile-time, a unit error check on the operation; and a means for detecting an error condition, based upon the operation, by comparing the unit designation of the at least one operand to the unit designation of the defined result.

30. A computer system for error checking comprising:

a memory storing at least one operand having a unit designation, and an operation on the at least one operand, the operation having a defined result having a unit designation; and a processor performing, at compile-time, a unit error check on the operation and detecting an error condition, based upon the operation, by comparing the unit designation of the at least one operand to the unit designation of the defined result.

* * * * *